United States Patent
Illg et al.

(10) Patent No.: US 9,835,451 B2
(45) Date of Patent: Dec. 5, 2017

(54) SYSTEM AND METHOD FOR DETERMINING A RIDE HEIGHT OF A MOTOR VEHICLE

(71) Applicant: Dr. Ing. h.c. F. Porsche Aktiengesellschaft, Stuttgart (DE)

(72) Inventors: Igor Illg, Renningen (DE); Thomas Mirwaldt, Stuttgart (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 533 days.

(21) Appl. No.: 14/503,893

(22) Filed: Oct. 1, 2014

(65) Prior Publication Data

US 2015/0094981 A1  Apr. 2, 2015

(30) Foreign Application Priority Data

Oct. 2, 2013 (DE) .......................... 10 2013 110 954

(51) Int. Cl.
| | |
|---|---|
| *B60W 40/12* | (2012.01) |
| *G01M 17/00* | (2006.01) |
| *G01M 17/04* | (2006.01) |
| *G01B 21/02* | (2006.01) |

(52) U.S. Cl.
CPC ............ *G01B 21/02* (2013.01); *B60W 40/12* (2013.01); *G01M 17/00* (2013.01); *G01M 17/04* (2013.01)

(58) Field of Classification Search
CPC ...... B60W 40/12; G01M 17/00; G01M 17/04; G01B 21/02
See application file for complete search history.

(56) References Cited

U.S. PATENT DOCUMENTS

| | | | |
|---|---|---|---|
| 5,627,751 A | 5/1997 | Davis et al. | |
| 8,229,639 B2 * | 7/2012 | Craig | B60T 8/1708 701/48 |
| 2001/0004147 A1 | 6/2001 | Reisinger et al. | |
| 2012/0303221 A1 | 11/2012 | Günthner et al. | |

FOREIGN PATENT DOCUMENTS

| | | |
|---|---|---|
| CN | 101112858 A | 1/2008 |
| DE | 19959658 A1 | 6/2001 |
| EP | 1792759 A2 | 6/2007 |
| KR | 1020070057477 | 6/2007 |
| KR | 1020080083283 | 9/2008 |
| KR | 1020100071974 | 7/2010 |
| WO | WO 2011/098333 A1 | 8/2011 |

OTHER PUBLICATIONS

German Search Report, dated Aug. 22, 2014, corresponding to counterpart German Patent Application No. 10 2013 110 954.3 (with partial English translation).

* cited by examiner

*Primary Examiner* — Bryan Bui
(74) *Attorney, Agent, or Firm* — RatnerPrestia

(57) ABSTRACT

A method for determining a ride height of a body of a motor vehicle and includes the steps of determining wheel heights at at least four different wheels of the motor vehicle, forming different selections of in each case three of the determined wheel heights, determining a ride height of the body for each selection, comparing the determined ride heights, and determining that at least one measurement value for a wheel height is implausible if the determined ride heights differ from one another by more than a predetermined amount.

12 Claims, 2 Drawing Sheets

SYSTEM AND METHOD FOR DETERMINING A RIDE HEIGHT OF A MOTOR VEHICLE

CROSS-REFERENCE TO RELATED APPLICATIONS

This application claims priority under 35 U.S.C. §119 of German Patent Application No. 10 2013 110 954.3, filed Oct. 2, 2013, which is incorporated by reference herein in its entirety.

FIELD OF THE INVENTION

The invention relates to determining a ride height of a body of a motor vehicle. In particular, the invention relates to plausibility checking and fault identification of a determination process of this kind.

BACKGROUND OF THE INVENTION

A motor vehicle comprises a number of wheels which are supported in relation to a body by means of a chassis. The chassis allows a predetermined vertical movement of each wheel in order to keep the wheels in contact with an underlying surface as far as possible and in order to prevent impacts and movements of the body. The body usually comprises a vehicle frame to which further elements of the motor vehicle are fitted, in particular a drive motor and a passenger compartment. The chassis comprises articulation connections of the wheels and usually a dedicated spring and damper unit for each wheel.

A ride height of the body in relation to the wheels or the underlying surface can be determined by wheel heights, which in each case indicate the distance between the body and the wheel, being linked to one another. The ride height of the body can be determined statically, so that a height or an inclination in the longitudinal or lateral direction of the body is determined, or dynamically by a movement of the body upward or downward and also rocking in the longitudinal or lateral direction being determined. The ride height of the body can be determined, in particular, in order to actively influence the chassis. For example, an electronic stability program can acquire information about the height of the center of gravity of the motor vehicle by means of the static or dynamic ride height. The height of the center of gravity can be changed, for example, by a roof load being applied to the motor vehicle. Influencing the chassis such that a situation of the motor vehicle being involved in an accident when traveling quickly around a curve is prevented, can take into account the height of the center of gravity and as a result achieve improved results. The ride height can be used in general by various safety or comfort systems on board the motor vehicle.

Since the ride height of the body can have an influence on a safety-related system of the motor vehicle, the process of determining the ride height has to meet stringent requirements in respect of accuracy or reliability which can be specified, for example, as a stage in the ASIL standard.

WO 2011/098333, which is incorporated by reference herein, A1 describes a vehicle sensor node in which a plurality of sensor elements which detect different primary measurement variables and use different measurement principles are provided. The plausibility of measurement values can be checked in this way.

EP 1 792 759 B1, which is incorporated by reference herein, describes an apparatus in which sensors are provided for ascertaining ride heights. Each sensor can diagnose an individual malfunction and output a corresponding signal. If too many sensors indicate that they are no longer functioning correctly, vehicle height regulation can be stopped.

U.S. Pat. No. 5,627,751, which is incorporated by reference herein, describes a method in which a measurement value of a damaged sensor can be replaced by a calculated signal.

SUMMARY OF THE INVENTION

The invention relates to reliably determining a ride height signal of a body on a motor vehicle in a cost-effective manner. The invention addresses this problem by means of a method, a computer program product and an apparatus, as is described hereinafter.

A method, according to aspects of the invention, for determining a ride height of a body of a motor vehicle comprises the steps of determining wheel heights at at least four different wheels of the motor vehicle, forming different selections of in each case three of the determined wheel heights, determining a ride height of the body for each selection, comparing the determined ride heights, and determining that at least one measurement value for a wheel height is implausible if the determined ride heights differ from one another by more than a predetermined amount.

It is assumed here that the body of the motor vehicle is substantially rigid and connection or sagging does not take place. The wheels are fitted such that they can move in relation to the body. A wheel height indicates the distance of a wheel or its associated axle from the body. Since a plane in space can already be clearly defined by three points, three wheel heights are sufficient in order to clearly determine the ride height of the body. However, a conventional motor vehicle usually has at least four wheels, and therefore redundant determination is performed. This redundant determination can be used to check the plausibility of the individual wheel heights in relation to one another. As a result, greater accuracy or greater reliability of the determined ride height can be achieved.

In a preferred embodiment, a high-frequency component is filtered out from the wheel heights in each case, before the ride heights of the body are determined. The high-frequency component usually relates to vertical wheel movements which can be caused, for example, by the motor vehicle traveling on an uneven underlying surface. The remaining low-frequency component of the wheel heights usually relates to movements of the body in relation to the wheels. The ride height of the body can be determined in an improved manner by filtering out the high frequency components.

The ride heights preferably comprise in each case a stroke, a roll angle and a pitch angle of the body. The stroke relates to a vertical movement of the body, the roll angle relates to an inclination transversely with respect to the direction of travel, and the pitch angle relates to an inclination in the direction of travel. Therefore, the ride height of the body can be completely described and the individual components can be further processed directly by a convenience or safety system of the motor vehicle. For example, the stroke can be integrated into a level control means, the roll angle can be integrated into a curve stability program, and the pitch angle can be integrated into a brake assistant.

In a further embodiment, the determined ride heights are compared with a discretely measured ride height. The discretely measured ride height can be determined, for example, by means of an acceleration sensor, a camera or else in some other way. A reference value with which the ride heights can be individually compared can be produced as a result.

In a further preferred embodiment, that measurement value for a wheel height which is implausible can further be determined if a lack of plausibility has been determined. To this end, the determined ride heights can be compared with the discretely measured ride height in pairs. If only one measurement value is implausible, each determined ride height which takes this measurement value into account is differentiated from the discretely measured ride height. In this way, a defective sensor for determining the wheel height can be identified for example. The measurement signal of this sensor can then be ignored in the following determination processes for the ride height.

In a yet further embodiment, the wheel heights and the ride heights are derived with respect to time, in order to determine movements of the body. Therefore, a dynamic component of the movement of the body can be taken into consideration. It is also possible to derive the wheel heights and the ride heights twice with respect to time, in order to take into consideration accelerations of the body.

A computer program product, according to aspects of the invention, comprises program coding means for carrying out the described method when the computer program product runs on a processing device or is stored in a computer-readable data storage medium.

An apparatus, according to aspects of the invention, for determining a ride height of a body of a motor vehicle comprises in each case one sensor for a wheel height at at least four different wheels of the motor vehicle and a processing device for recording measurement values for the wheel heights of the sensors. In the process, the processing device is designed to determine a ride height of the body for each selection, to compare the determined ride heights with one another, and to determine that at least one measurement value for a wheel height is implausible if the determined ride heights differ from one another by more than a predetermined amount.

BRIEF DESCRIPTION OF THE DRAWINGS

The invention will now be described more precisely with reference to the appended figures, in which.

DETAILED DESCRIPTION OF THE INVENTION

Figure 1:
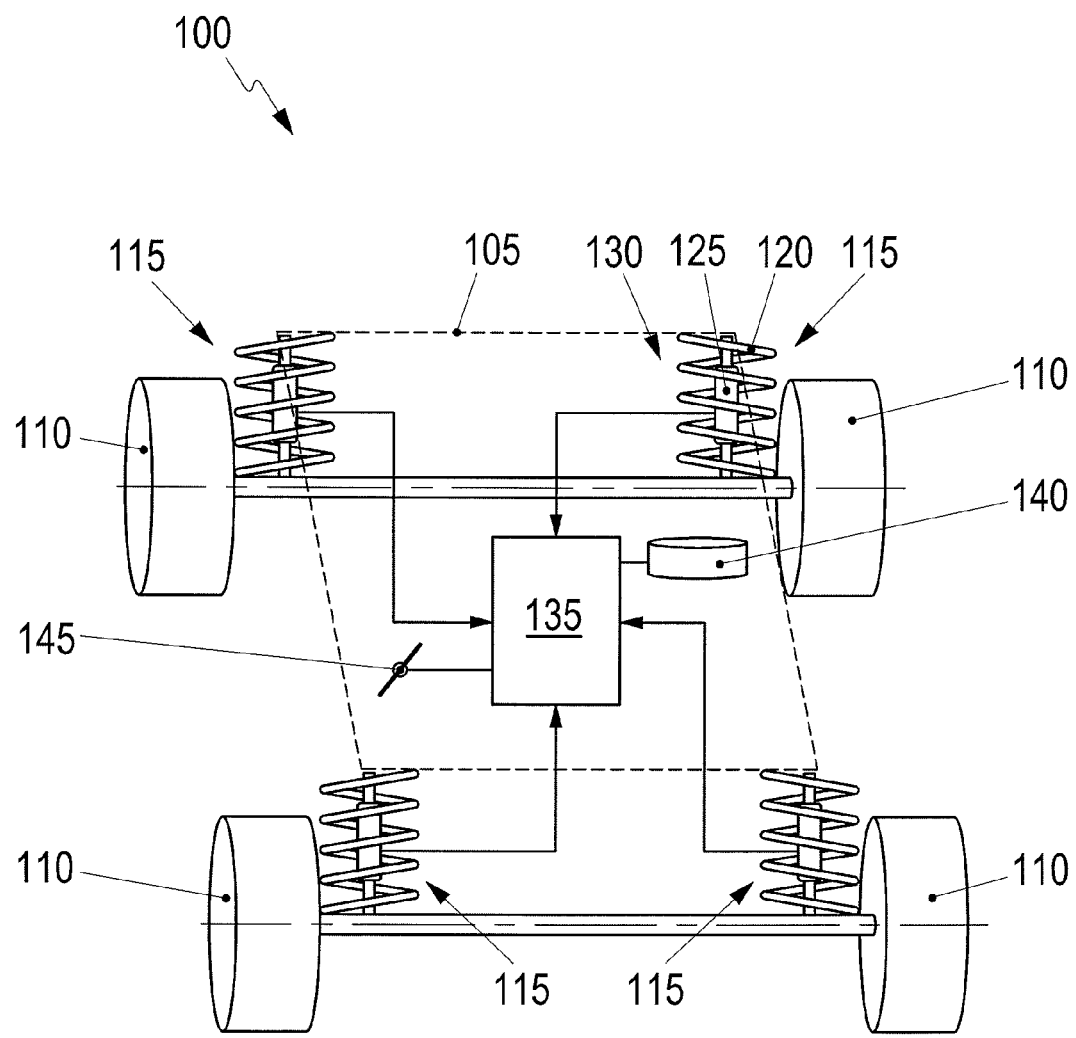
FIG. 1 shows a motor vehicle with ride height determination.

FIG. 1 schematically shows a motor vehicle 100 with ride height determination. The motor vehicle 100 comprises a body 105 which usually comprises a vehicle frame and various add-on components. In the text which follows, it is assumed that the body 105 is designed to be resistant to bending and twisting. Furthermore, the motor vehicle 100 comprises at least four wheels 110 which can be fitted, for example, at the front left, front right, rear left and rear right of the motor vehicle 100. In other exemplary embodiments, more than four wheels 110 can also be used as desired. A chassis 115 connects the wheels 110 to the body 105. The chassis 115 usually comprises a number of springs 120 with dampers 125. In one embodiment, each wheel 110 is supported on the body 105 by an associated combination of spring 120 and damper 125. The type of mechanical articulated connection of the wheel 110 in relation to the body 105 is not important in this case. For example, an individual wheel suspension or a bent or rigid axle can be selected. The spring 120 is preferably designed as a helical spring, but can also be designed, for example, as a leaf spring, pneumatic spring bellows or rotary bar spring in other embodiments. The damper 125 usually operates in a hydropneumatic manner, but can also be designed differently, for example as a magnetorheological frictional damper. The spring 120 and the damper 125 can be designed such that they are integrated one in the other. It is also feasible for the spring 120 and the damper 125 to be of partially or completely electromechanical design.

Each wheel 110 has an associated wheel height sensor 130. The wheel height sensor 130 can be implemented in a manner integrated with the damper 125 and/or the spring 120. A processing device 135 is connected to the wheel height sensors 130. The processing device 135 determines a ride height of the body 105, which ride height has been checked for plausibility, on the basis of the measurement values supplied by the wheel height sensors 130. The ride height of the body 105 usually describes an orientation of the body 105 in relation to an underlying surface on which the wheels 110 stand. An absolute orientation of the body 105, which takes into account an inclination or a gradient of the underlying surface, is usually not determined.

A discrete ride height sensor 140 can optionally be provided, said ride height sensor determining the ride height of the body 105 on the basis of other sensor values. Corresponding sensors can comprise, in particular, an acceleration sensor, an inclination sensor or a distance sensor. The ride height sensor 140 can also, for example, visually determine the ride height of the body 105.

An interface 145 is preferably provided, the processing device 135 outputting the determined ride height of the body 105 via said interface. In addition, a signal can be output via the interface 145 or a separate interface when it has been determined that the determined ride height is based on implausible measurement values. In one embodiment, the processing device 135 is also designed to determine, when there is an implausible measurement value, which of the wheel height sensors 130 has supplied the implausible measurement value. A signal which indicates a malfunction in the wheel height sensor 130 in question can then be output via the interface 145 or another interface.

Figure 2:
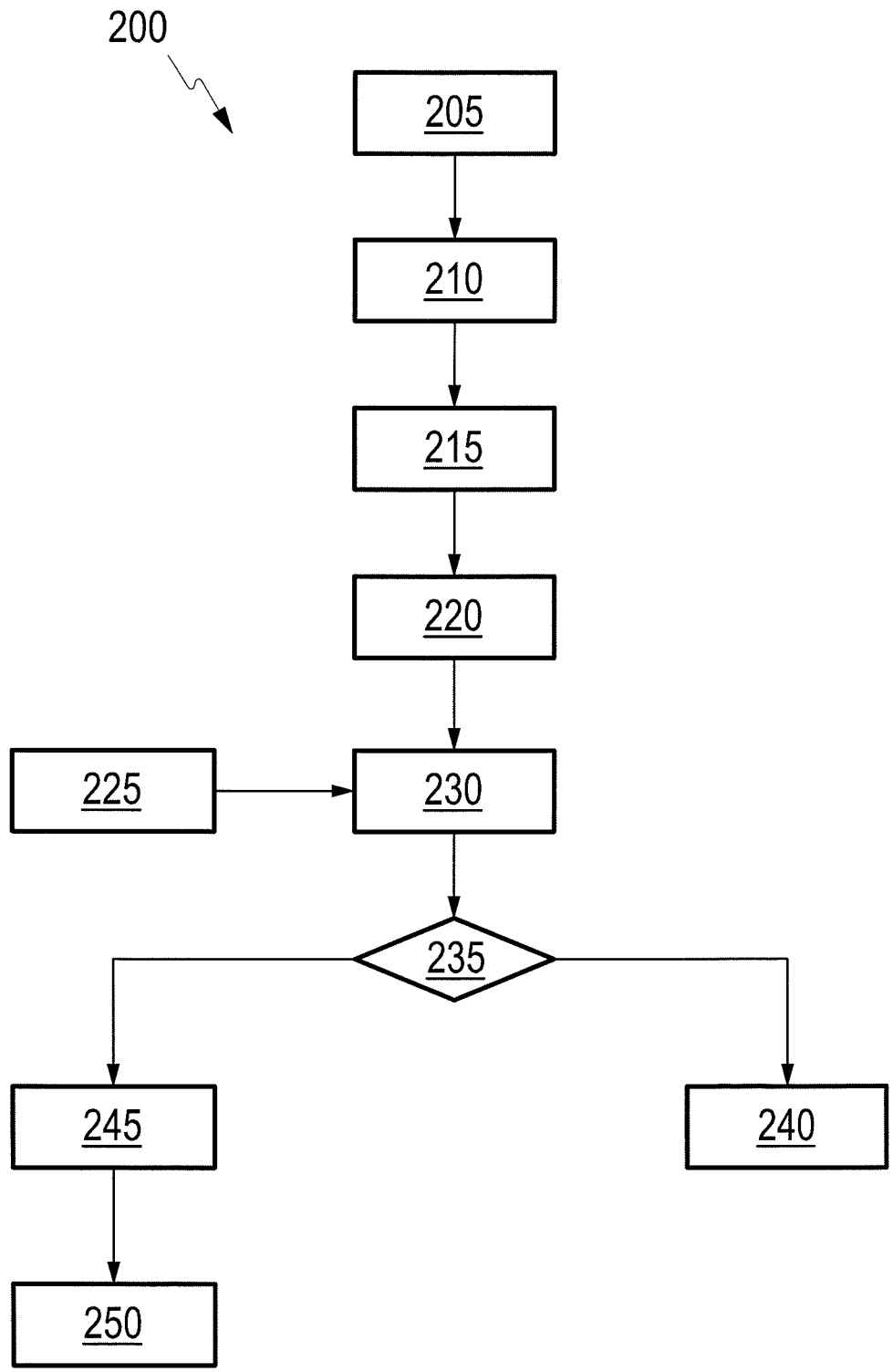
FIG. 2 shows a flowchart of a method for determining the ride height in the motor vehicle from FIG. 1.

FIG. 2 shows a flowchart of a method 200 for determining the ride height of the body 105 in the motor vehicle 100 from FIG. 1. The process generally proceeds from a motor vehicle which has n wheels 110, where: $n \geq 4$.

In a first step 205, a wheel height is determined for each of the n wheels, in particular by means of an associated wheel height sensor 130. In an optional step 210, a time sequence of measurement values which are associated with a wheel 110 is freed of high-frequency components, for example by means of a low-pass filter. This process is performed for the measurement values of each of the n wheels 110.

In a step 215, selections are determined. Each selection comprises three wheel heights of different wheels 110. In the case of n wheels, $$\binom{n}{3}$$

different combinations of three wheel heights can generally be formed. Therefore, four combinations can be formed in the case of four wheels, ten combinations can be formed in the case of five wheels, 20 combinations can be formed in the case of six wheels etc. In a step 220, a ride height of the body 105 is determined for each selection from step 215. The measurement values of each selection in each case comprise three wheel heights which describe a clear orientation of the body 105 with respect to the wheels 110. Assuming that each wheel 110 is in contact with an underlying surface, the ride height of the body 105 can therefore also be determined with respect to the underlying surface.

In a step 225, a discrete measurement of the ride height can optionally also be performed, for example by means of the ride height sensor 140. The determined ride heights are compared with one another in a step 230. In a simple embodiment, it is only established in this case whether all of the determined ride heights are approximately the same, that is to say differ from one another by no more than a predetermined amount. The predetermined amount can be indicated in absolute or relative terms. A measurement corridor is formed by the absolute amount, said measurement corridor being defined by an average value of the determined ride heights. In a step 235, it is then determined whether all of the determined ride heights of the body 105 lie within the determined measurement corridor. If this is the case, one of the determined ride heights can be output in a step 240. As an alternative, an average value or another combination of the determined ride heights can also be output. It is also possible for only a signal indicating that the plausibility of the measurement values of the wheel heights in relation to one another could be checked to be output.

If it was determined in step 235 that not all of the ride heights are located in the measurement corridor, a signal can be output in a step 245 which indicates that the plausibility of the determination of the ride height of the body 105 could not be checked or that at least one measurement value of a wheel height is implausible.

In this case, it is possible to optionally further determine, in a step 250, which of the measurement values of the wheel heights is implausible. To this end, the determined ride heights can be compared with the discretely measured ride height of the ride height sensor 140 in pairs. The determined ride heights, which deviate significantly from the ride height of the ride height sensor 140, can then be used to determine which wheel height forms the basis for said ride heights. An indication indicating the wheel height which is identified as implausible or the associated wheel height sensor 130 can then be output, for example via the interface 145.

After steps 240 or 245 and 250, method 200 can be run through again. It is also possible to execute the method 200 in respect of its deviations with respect to time rather than in respect of wheel heights. To this end, a deviation with respect to time of each determined wheel height can be determined, for example, in step 205 or 210. A dynamic ride height of the body 105 is determined as a result. In another embodiment, deviation with respect to time can also be performed twice, in order to determine an acceleration of the ride height of the body 105.

The ride height of the body 105 is preferably expressed by three components, of which one relates to a stroke, one relates to a roll angle and one relates to a pitch angle of the body 105. The determined wheel heights can be transformed into a ride height of this kind as follows:

$$\begin{bmatrix} z_{vl} \\ z_{vr} \\ z_{hl} \end{bmatrix} = T \begin{bmatrix} z_{Stroke} \\ \varphi_{Pitch} \\ \varphi_{Roll} \end{bmatrix} = z_{A,1}; \begin{bmatrix} z_{vl} \\ z_{vr} \\ z_{hr} \end{bmatrix} = T \begin{bmatrix} z_{Stroke} \\ \varphi_{Pitch} \\ \varphi_{Roll} \end{bmatrix} = z_{A,2};$$

$$\begin{bmatrix} z_{vl} \\ z_{hr} \\ z_{hl} \end{bmatrix} = T \begin{bmatrix} z_{Stroke} \\ \varphi_{Pitch} \\ \varphi_{Roll} \end{bmatrix} = z_{A,3}; \begin{bmatrix} z_{vr} \\ z_{hr} \\ z_{hl} \end{bmatrix} = T \begin{bmatrix} z_{Stroke} \\ \varphi_{Pitch} \\ \varphi_{Roll} \end{bmatrix} = z_{A,4}.$$

In the above:
z denotes the wheel height or vertical distance measurement of body 105 to wheel 110
vr denotes front right
vl denotes front left
hr denotes rear right
hl denotes rear left
φ denotes angle
Pitch denotes pitch direction, that is to say front to rear in respect of the direction of travel
Roll denotes roll direction, that is to say left to right in respect of the direction of travel
T denotes transformation matrix
$z_A$ denotes ride height comprising the three components stroke, pitch, roll.

What is claimed is:

1. A method for determining a ride height of a body of a motor vehicle, comprising the following steps:
    measuring wheel heights (WH1, WH2, WH3, WH4) at at least four different wheels of the motor vehicle;
    selecting different combinations ((WH1, WH2, WH3); (WH1, WH2, WH4); (WH2, WH3, WH4); (WH1, WH3, WH4)) of three of the four measured wheel heights (WH1, WH2, WH3, WH4);
    determining the ride height (RH1, RH2, RH3, RH4) of the body for each selection ((WH1, WH2, WH3); (WH1, WH2, WH4); (WH2, WH3, WH4); (WH1, WH3, WH4), respectively);
    comparing the determined ride heights (RH1, RH2, RH3, RH4);
    determining that at least one measurement value for a wheel height (WH1, WH2, WH3, WH4) is implausible if the determined ride heights (RH1, RH2, RH3, RH4) differ from one another by more than a predetermined amount;
    re-determining the ride height (RH1, RH2, RH3, RH4) of the body for each selection ((WH1, WH2, WH3); (WH1, WH2, WH4); (WH2, WH3, WH4); (WH1, WH3, WH4), respectively) while disregarding the at least one measurement value for a wheel height WH1, WH2, WH3, WH4) determined to be implausible; and
    adjusting a chassis of the motor vehicle based upon the re-determined ride heights (RH1, RH2, RH3, RH4) of the motor vehicle.

2. The method as claimed in claim 1, wherein a high-frequency component is filtered out from the wheel heights, before the ride heights of the body are determined.

3. The method as claimed in claim 1, wherein each ride height comprises a stroke, a roll angle and a pitch angle of the body.

4. The method as claimed in claim 1, wherein the determined ride heights are compared with a discretely measured ride height.

5. The method as claimed in claim 1, wherein the wheel heights and the ride heights are derived with respect to time, in order to determine movements of the body.

6. A computer program product having program coding means for carrying out the method as claimed in claim 1, when the computer program product runs on a processing device or is stored in a computer-readable data storage medium.

7. An apparatus for determining a ride height of a body of a motor vehicle, comprising the following elements:
sensors for sensing a wheel height at at least four different wheels of the motor vehicle; and
a processing device for recording measurement values for the wheel heights (WH1, WH2, WH3, WH4) sensed by the sensors;
wherein the processing device is configured to:
select different combinations ((WH1, WH2, WH3); (WH1, WH2, WH4); (WH2, WH3, WH4); (WH1, WH3, WH4)) of three of the four sensed wheel heights (WH1, WH2, WH3, WH4);
determine the ride height (RH1, RH2, RH3, RH4) of the body for each selection ((WH1, WH2, WH3); (WH1, WH2, WH4); (WH2, WH3, WH4); (WH1, WH3, WH4), respectively);
compare the determined ride heights (RH1, RH2, RH3, RH4);
determine that at least one measurement value for a wheel height (WH1, WH2, WH3, WH4) is implausible if the determined ride heights (RH1, RH2, RH3, RH4) differ from one another by more than a predetermined amount;
re-determine the ride height (RH1, RH2, RH3, RH4) of the body for each selection ((WH1, WH2, WH3); (WH1, WH2, WH4); (WH2, WH3, WH4); (WH1, WH3, WH4), respectively) while disregarding the at least one measurement value for a wheel height WH1, WH2, WH3, WH4) determined to be implausible; and
adjust a chassis of the motor vehicle based upon the re-determined ride heights (RH1, RH2, RH3, RH4) of the motor vehicle.

8. A motor vehicle comprising:
a vehicle body and a chassis;
at least four different wheels attached to the vehicle body;
sensors for sensing a wheel height of the at least four different wheels of the motor vehicle; and
a processing device for recording measurement values for the wheel heights (WH1, WH2, WH3, WH4) sensed by the sensors;
wherein the processing device is configured to:
select different combinations ((WH1, WH2, WH3); (WH1, WH2, WH4); (WH2, WH3, WH4); (WH1, WH3, WH4)) of three of the four sensed wheel heights (WH1, WH2, WH3, WH4);
determine the ride height (RH1, RH2, RH3, RH4) of the body for each selection ((WH1, WH2, WH3); (WH1, WH2, WH4); (WH2, WH3, WH4); (WH1, WH3, WH4), respectively);
compare the determined ride heights (RH1, RH2, RH3, RH4);
determine that at least one measurement value for a wheel height (WH1, WH2, WH3, WH4) is implausible if the determined ride heights (RH1, RH2, RH3, RH4) differ from one another by more than a predetermined amount;
re-determine the ride height (RH1, RH2, RH3, RH4) of the body for each selection ((WH1, WH2, WH3); (WH1, WH2, WH4); (WH2, WH3, WH4); (WH1, WH3, WH4), respectively) while disregarding the at least one measurement value for a wheel height WH1, WH2, WH3, WH4) determined to be implausible; and
adjust the chassis of the motor vehicle based upon the re-determined ride heights (RH1, RH2, RH3, RH4) of the motor vehicle.

9. The motor vehicle as claimed in claim 8, wherein the processor is configured to filter out a high-frequency component from the wheel heights, before the ride heights of the body are determined.

10. The motor vehicle as claimed in claim 8, wherein each ride height comprises a stroke, a roll angle and a pitch angle of the body.

11. The motor vehicle as claimed in claim 8, wherein the processor is configured to compare the determined ride heights with a discretely measured ride height.

12. The motor vehicle as claimed in claim 8, wherein the processor is configured to derive the wheel heights and the ride heights with respect to time, in order to determine movements of the body.

* * * * *